May 18, 1965   L. H. TUGGLE   3,183,899
CHAFF-PROOF AIR INTAKE ARRANGEMENT
Filed Nov. 14, 1962
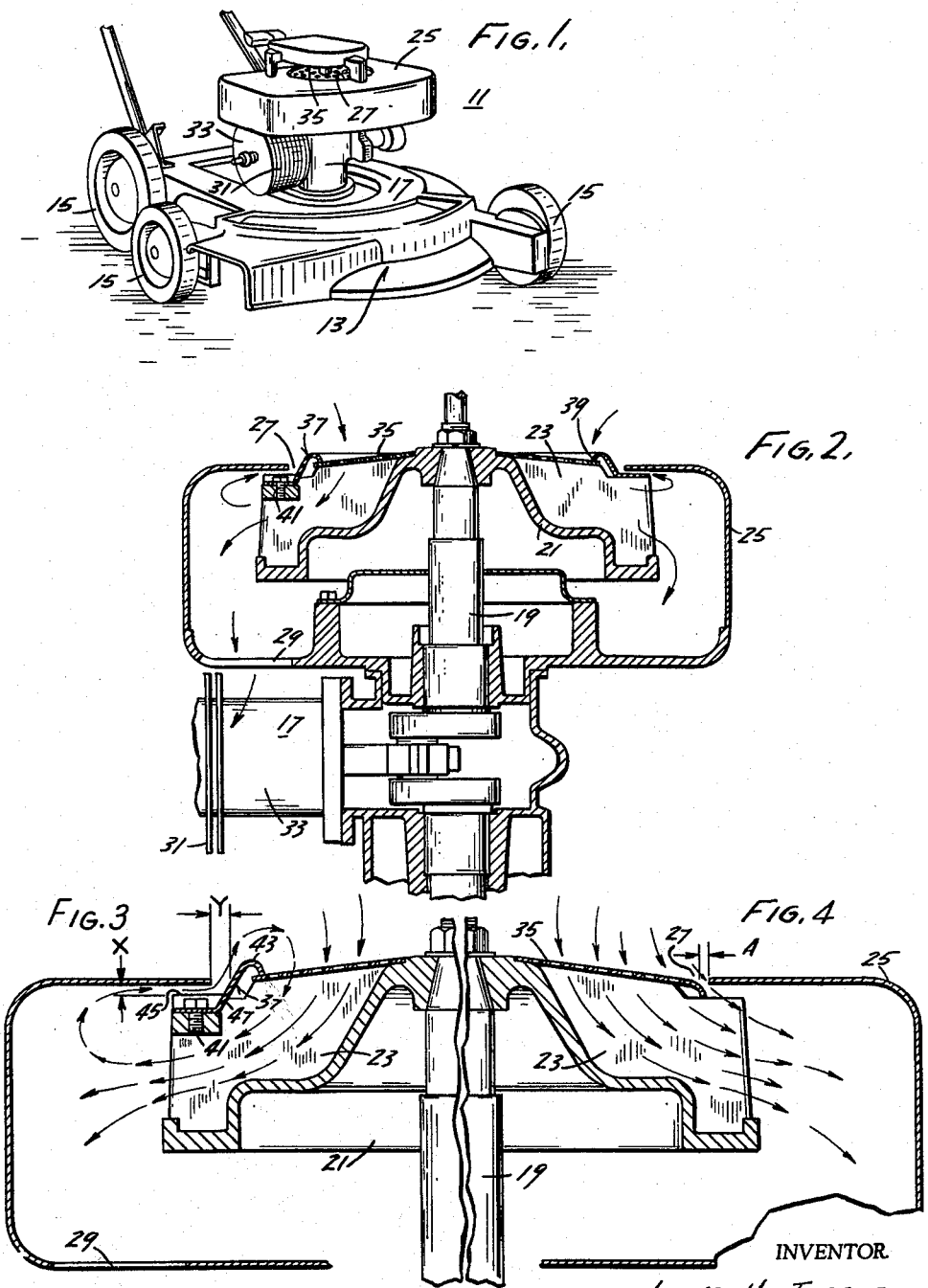
INVENTOR
LLOYD H. TUGGLE
BY Wheeler, Wheeler & Wheeler
ATTORNEYS.

United States Patent Office 3,183,899
Patented May 18, 1965

3,183,899
CHAFF-PROOF AIR INTAKE ARRANGEMENT
Lloyd H. Tuggle, Lamar, Mo., assignor to Outboard Marine Corporation, Waukegan, Ill., a corporation of Delaware
Filed Nov. 14, 1962, Ser. No. 237,506
6 Claims. (Cl. 123—41.65)

The invention relates generally to cooling-air intakes with means for excluding foreign matter. More specifically, the invention relates to air-cooled engines including a fan which serves to direct cooling air toward the engine. Still more particularly, the invention relates to lawn mowers.

In its broadest form, the invention is directed toward preventing unwanted solid materials from being sucked into a fan housing. More particularly, the invention is directed to a chaff-excluding air inlet for flywheel blowers and finds particular utility in connection with lawn mowers which are powered by air-cooled engines, such, for example, as an air-cooled internal combustion engine. Such engines commonly have flywheels which are vaned to function as blowers for the purpose of directing a flow of cooling air through a housing or shroud at least partially surrounding the engine and into contact with the engine block or cooling fins thereof. In order to keep out unwanted solid materials, as for instance, chaff produced during grass cutting, previous lawn mowers have included a screen carried by the vaned flywheel and occupying the major part of an opening in the shroud through which the air flow passed. There resulted a relatively small, unscreened annular entry into the shroud around the periphery of the screen.

Despite the generally good chaff-excluding proficiency of this arrangement, nevertheless an undesirable amount of chaff eventually entered into the shroud through the annular entry and was thereafter deposited on the engine block, thereby decreasing the cooling efficiency of the arrangement. The invention overcomes this problem by use of an imperforate ring element which is carried by the flywheel with its inner margin in engagement with the screen, which generally blocks the previously open annular entry between the periphery of the screen and the margin of the shroud opening, and which has an outer margin extending into the shroud in generally opposing, adjacently spaced relation to the margin of the opening in the shroud.

With this arrangement, the inflow of air through the screen and into the shroud tends to pressurize the shroud and to create a back flow of air through the area between the outer margin of the ring element and the margin of the opening in the shroud. Inflow of air and accompanying chaff between the ring element and the shroud is thereby effectively prevented.

Other objects and advantages of the invention will become known by reference to the following description and the accompanying drawings of one embodiment of the invention.

In the drawings:

FIG. 1 is a perspective view of a lawn mower 11 embodying the invention;

FIG. 2 is an enlarged, sectional view of a part of the lawn mower shown in FIG. 1;

FIG. 3 is a further enlarged, sectional view of a part of FIG. 2; and

FIGURE 4 is a view similar to FIGURE 3, illustrating a typical previous construction.

The lawn mower 11 shown in FIG. 1 is merely exemplary of various structures including an air intake opening which is desirably protected against the inflow of unwanted solid materials. The lawn mower 11 includes a blade housing 13 which is supported for travel over the ground by a plurality of wheels 15. Supported by the blade housing 13 is an engine or motor, as for example, an internal combustion engine 17 including an output or crankshaft 19. Carried on the output shaft 19 is a flywheel 21 which includes a plurality of radially projecting vanes 23 and therefore also serves as a fan member. In the broadest sense of the invention, the fan member need not be part of a flywheel and can be mounted on any rotatably supported shaft.

Generally enclosing the flywheel 21 is a housing or shroud 25 which at least partially surrounds or overlies a portion of the engine 17. Included in the shroud 25 is an intake opening 27 located in generally co-axial alignment with the flywheel 21. The shroud 25 further includes a discharge opening 29 located so as to conduct a flow of air toward a series of cooling fins 31 extending from the cylinder 33 of the engine 17.

Carried on the flywheel 21 in engagement with the top edges of the vanes 23 is a perforated member or screen 35 adapted to exclude entry of unwanted solid materials. As shown in FIG. 4, in some prior constructions the screen member 35 terminates inwardly of the periphery of the shroud opening 27, leaving an annular entry with a radial width indicated by the reference character A. Through this entry chaff passed into the shroud 25 and was eventually desposited on the cooling fins 31, thereby detracting from their efficiency.

In the practice of the invention as shown in FIGURE 3, an imperforate annular member or ring 37 is carried by the flywheel 21 and includes an inner peripheral portion or margin in engagement with the screen 35. Such engagement can be used, at least in part, to retain the screen in place. The annular member also includes an outer peripheral portion or margin which blocks or obstructs the annular entry designated by the reference character A in FIGURE 4 and which extends within the shroud 25 in opposing relation to the margin of the opening 27, thereby defining a narrow passage including a horizontally extending portion or gap, indicated by the reference character X, and a vertically extending portion, indicated by the reference character Y. As shown to the left in FIGURE 2 and in FIGURE 3, the annular member 37 can be secured to the flywheel by one or more screws 41 respectively threaded into the outer portions of the vanes 23. If desired, the screen and the annular ring can be fabricated in one piece and secured to the flywheel by the screws 41.

More specifically, the inner margin of the ring 37 includes a section 43 which is arcuately reversely curved in radial cross section and which engages the screen 35. The outer margin of the ring 37 includes a flat peripheral section 45 and a transition section 47 connecting the peripheral section 45 to the curved section 43.

In operation, when the flywheel 21 is rotated, air is drawn through the screen 35 and is delivered into the shroud 25. This air flow tends to pressurize the shroud, which pressure, in turn, tends to produce a back flow through the passage indicated by the reference characters X and Y. This back flow, coupled with the projection of the transition and peripheral sections 45 and 47 of the ring 37 across the annular entry, indicated by the reference character A, effectively precludes entry of air into the shroud except through the screen 35. As a result, the entry of chaff or other solid materials into the shroud is reliably excluded.

Various of the features of the invention are set forth in the following claims.

What is claimed is:

1. An air-cooled engine including a flywheel having a plurality of radially projecting vanes, a shroud disposed around said flywheel, having an air-entry opening generally co-axial with said flywheel, and an air-discharge opening adapted for directing a flow of air toward said engine, a screen carried adjacent to said vanes by said flywheel, and an imperforate ring carried by said flywheel, said ring including an inner margin extending from said screen, and an outer margin extending within said shroud and beyond the peripheral edge of said shroud opening and in generally opposing relation to the margin extending from the peripheral edge of said shroud opening, the radial extent of said outer margin beyond the peripheral edge of said shroud opening being at least as great as the shortest distance between the periphery of said outer margin and said housing.

2. A lawn mower including an engine having a cylinder and a flywheel with a plurality of radially projecting vanes, a shroud disposed around said flywheel, having an air-entry opening generally co-axial with said flywheel, and an air-discharge opening adapted to direct air toward said cylinder, a screen carried adjacent to said vanes by said flywheel, and an imperforate ring carried by said flywheel and extending from said screen radially outwardly and including an annular section extending within said shroud in generally opposing, substantially parallel relation to the margin of said opening in said shroud.

3. An air-intake arrangement including a frame, a vaned member inducing air flow in response to rotation thereof, means on said frame supporting said member for rotation, a housing on said frame generally surrounding said vaned member and including an opening generally co-axial with said vaned member for air passage through said opening in response to rotation of said vaned member, and a screen on said vaned member in adjacent relation to said opening, and an annular imperforate part on said vaned member and extending from said screen and including an outer peripheral margin extending within said housing in adjacently spaced, generally opposing and substantially parallel relation to the margin of said opening in said housing.

4. An air-intake arrangement including a frame, a member having a series of vanes, and means on said frame supporting said member for rotation, a housing on said frame generally surrounding said vaned member and including a circular opening generally coaxial with and adjacent to the vaned member for air flow therethrough relative to said housing in response to rotation of said vaned member, a screen carried by said vaned member with the periphery thereof terminating in adjacently spaced relation to and radially inwardly of the periphery of said opening, and an imperforate ring element carried by said vaned member and including an inner margin extending from said screen and an outer margin generally extending across the area between the periphery of said screen and the periphery of the opening in said housing to substantially the outer periphery of said vanes.

5. An air intake arrangement in accordance with claim 4 including means fixing said ring element to said vaned member and wherein said screen is retained on said vaned member by confinement between said ring element and said vaned member and wherein said outer margin of said ring element extends within said housing in generally opposing, adjacently spaced relation to the margin of said housing surrounding said opening.

6. An air-intake arrangement including a frame, a housing on said frame including a circular opening for the flow of air therethrough, a member having a series of radially extending vanes, said vanes each having a radial extent greater than the radius of said opening, means on said frame supporting said member for rotation within said housing, in co-axial relation with said circular opening and with said vanes adjacent to said circular opening, a screen on said vaned member in adjacent relation to said opening, and an annular imperforate part extending from said screen and including an outer margin extending to substantially the outer periphery of said vanes.

References Cited by the Examiner
UNITED STATES PATENTS

| Re. 23,146 | 9/49 | Packwood | 123—41.65 |
| 2,601,907 | 7/52 | Burrows et al. | 55—406 |
| 2,823,656 | 2/58 | Dolza | 55—400 |
| 3,045,411 | 7/62 | Dalrymple | 55—400 |

RICHARD B. WILKINSON, *Primary Examiner.*